US 9,508,967 B2

(12) United States Patent
Yeh (10) Patent No.: US 9,508,967 B2
(45) Date of Patent: Nov. 29, 2016

(54) BATTERY-EMBEDDED BOARD

(71) Applicant: Kerties International Co., Ltd, New Taipei (TW)

(72) Inventor: Chang-Chi Yeh, New Taipei (TW)

(73) Assignee: KERTIES INTERNATIONAL CO., LTD., New Taipei (TW)

(*) Notice: Subject to any disclaimer, the term of this patent is extended or adjusted under 35 U.S.C. 154(b) by 40 days.

(21) Appl. No.: 14/588,904

(22) Filed: Jan. 3, 2015

(65) Prior Publication Data

US 2015/0372266 A1    Dec. 24, 2015

(30) Foreign Application Priority Data

Jun. 24, 2014   (TW) .............................. 103121787 A (51) Int. Cl.
| | | |
|---|---|---|
| *H01M 2/04* | (2006.01) | |
| *H01M 2/10* | (2006.01) | |
| *H01M 2/02* | (2006.01) | |
| *H01M 2/20* | (2006.01) | |
| *H01M 2/30* | (2006.01) | |
| H01M 2/24 | (2006.01) | |

(52) U.S. Cl.
CPC ......... *H01M 2/1077* (2013.01); *H01M 2/0245* (2013.01); *H01M 2/206* (2013.01); *H01M 2/305* (2013.01); *H01M 2/1061* (2013.01); *H01M 2/24* (2013.01); *H01M 2220/10* (2013.01)

(58) Field of Classification Search
CPC .................... H01M 10/0525; H01M 10/0436
See application file for complete search history.

(56) References Cited

U.S. PATENT DOCUMENTS

| | | | | |
|---|---|---|---|---|
| 2005/0130030 A1* | 6/2005 | Watanabe | ........... | H01M 2/1061 429/100 |
| 2006/0234119 A1 | 10/2006 | Kruger et al. | | |
| 2011/0195299 A1* | 8/2011 | Hashimoto | ....... | H01M 10/0413 429/153 |
| 2012/0091955 A1* | 4/2012 | Gao | .................... | B60L 11/1822 320/109 |
| 2012/0141838 A1* | 6/2012 | Lin | ....................... | H01M 2/026 429/7 |

FOREIGN PATENT DOCUMENTS

| | | |
|---|---|---|
| CN | 203644848 U | 6/2014 |
| FR | 1337256 A | 9/1963 |
| FR | 82832 E | 4/1964 |

OTHER PUBLICATIONS

Search Report of the Corresponding European Patent Application No. 15171440.9.

* cited by examiner

*Primary Examiner* — Stewart Fraser
*Assistant Examiner* — Olatunji Godo
(74) *Attorney, Agent, or Firm* — HDLS IPR Services; Chun-Ming Shih (57) ABSTRACT

A battery-embedded plate includes a base and a battery is present. The base has an accommodation space on a bottom face, and comprises a corner-locating element and two edge-locating elements, each of the two edge-locating elements adjoins to one side of the corner-locating element respectively and two through slots communicated with the accommodation space is defined respectively between each edge-locating element and each side of the corner-locating element. The battery is set in the accommodation space and fixed by the corner-locating element and the two edge-locating elements. The battery is electrically connected with a positive cable and a negative cable respectively, and the two cables are extended out of the accommodation space through the two through slots respectively.

10 Claims, 8 Drawing Sheets

BATTERY-EMBEDDED BOARD

BACKGROUND OF THE INVENTION

1. Field of the Invention

The invention related to a board, and in particular to a board embedded a battery.

2. Description of Prior Art

Environmental protection is an important topic recently. Following the purpose of the environmental protection, green buildings and natural power generation apparatuses are developed very quickly.

Generally, most of the well-known natural power generation apparatuses, such as solar thermal power generation apparatus, hydraulic power generation apparatus and wind power generation apparatus, can generate electrical power by transforming natural power. However, the transformation rate of existing natural power generation apparatuses is too low to stably provide electrical power to user.

If the user wants to use electrical power stably, a well-known way is to build a battery with big electricity storage capacity (for example, a large battery). The battery stores power generated by the natural power generation apparatuses when the user does not need to use power, and provides the stored power to the user when receiving a requirement.

However, most people thinks that the large battery mentioned above brings height risk and danger. Besides, the large battery will occupy indoor spaces of a building (such as an office or an apartment). As a result, people now lacks the desire to use the natural power generating apparatuses, and natural power is very hard to be popular.

SUMMARY OF THE INVENTION

According to the above descriptions, the invention provides a battery-embedded board, the board is embedded with a battery internally and is used to construct floors, walls or ceilings of a building, and the building can omit a storing space for storing batteries.

To achieve the above purpose, the board of the present invention includes a base and a battery is present. The base has an accommodation space on a bottom face, and comprises a corner-locating element and two edge-locating elements, each of the two edge-locating elements adjoins to one side of the corner-locating element respectively and two through slots communicated with the accommodation space is defined respectively between each edge-locating element and each side of the corner-locating element. The battery is set in the accommodation space and fixed by the corner-locating element and the two edge-locating elements. The battery is electrically connected with a positive cable and a negative cable respectively, and the two cables are extended out of the accommodation space through the two through slots respectively.

The present invention combines the battery and the base into the battery-embedded board, and uses the board to construct floors, walls and ceilings of a building. By using the board of the present invention, the building can store an extreme number of batteries to build a big capacity electricity storage space without occupying indoor spaces of the building.

Furthermore, the present invention can be used with green buildings capable of natural power generating ability, the green buildings can use the big capacity electricity storage space built by the boards of the present invention to store power generated by wind power generation apparatuses, hydraulic power generation apparatuses or solar thermal power generation apparatuses. Therefore, it can raise user desire to use natural power generating apparatuses in their house.

DETAILED DESCRIPTION OF THE INVENTION

Figure 1A:
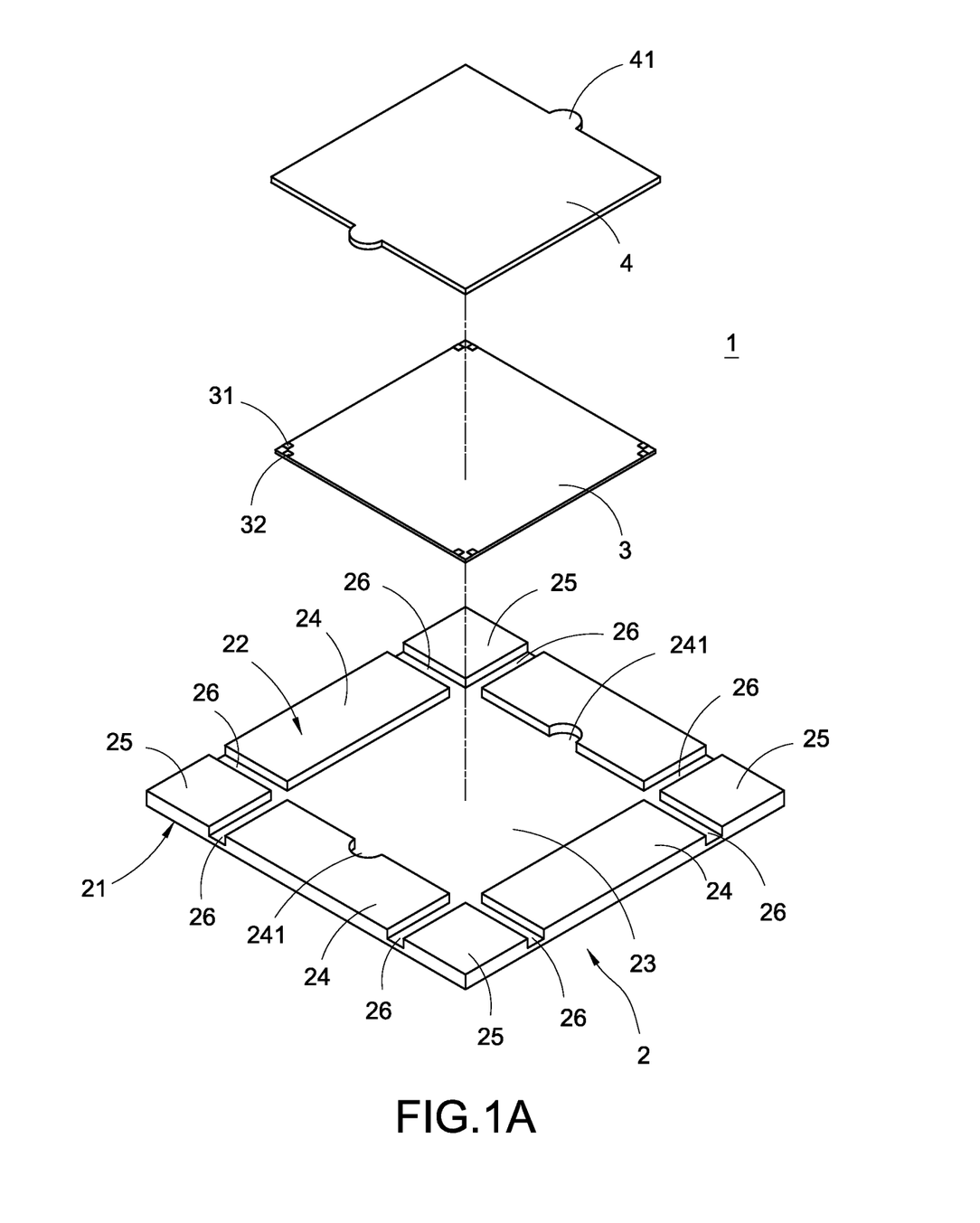
FIG. 1A is an exploded perspective view of a first embodiment according to the present invention.
Figure 1B:
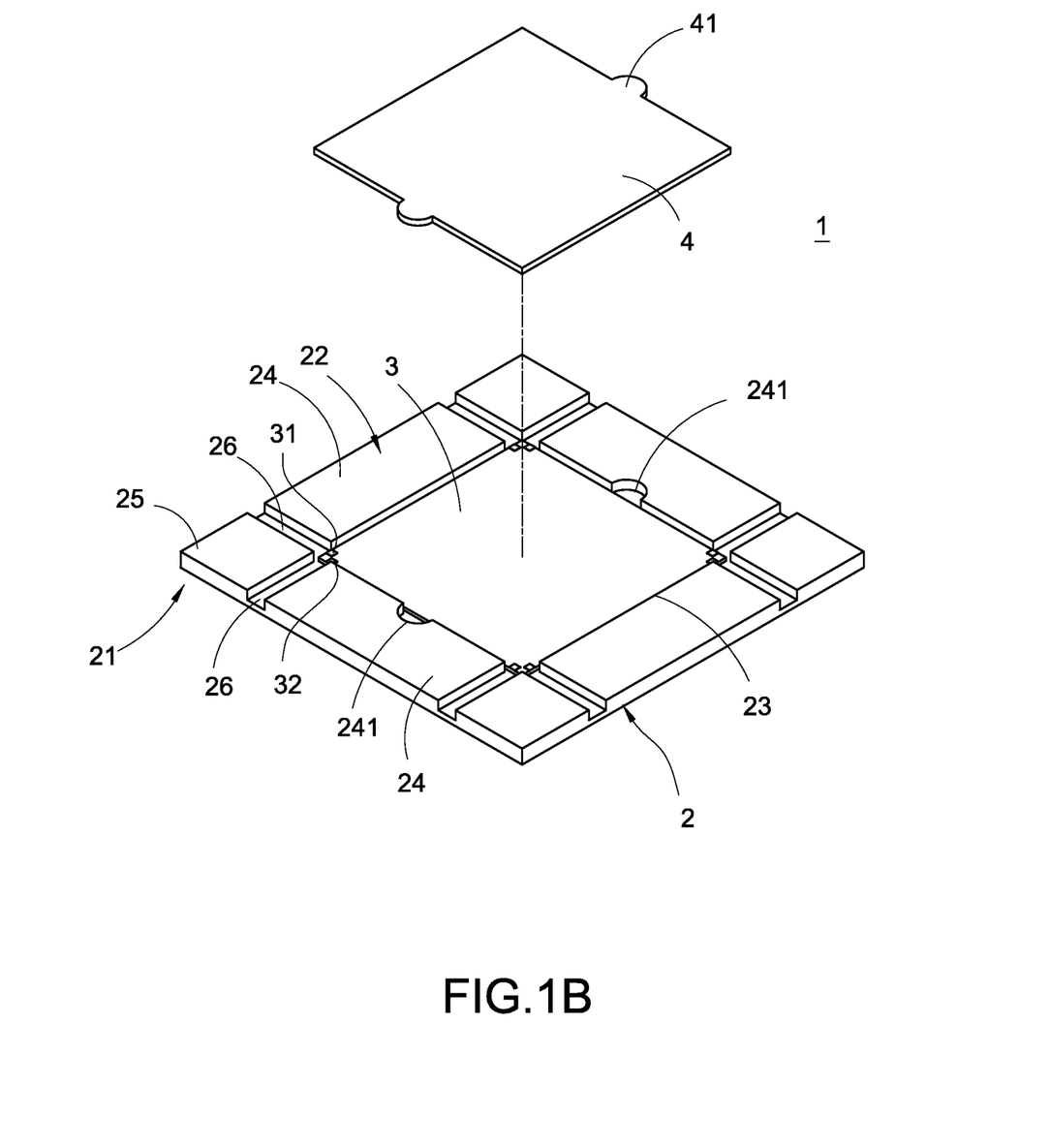
FIG. 1B is a first assembled perspective view of the first embodiment according to the present invention.
Figure 1C:
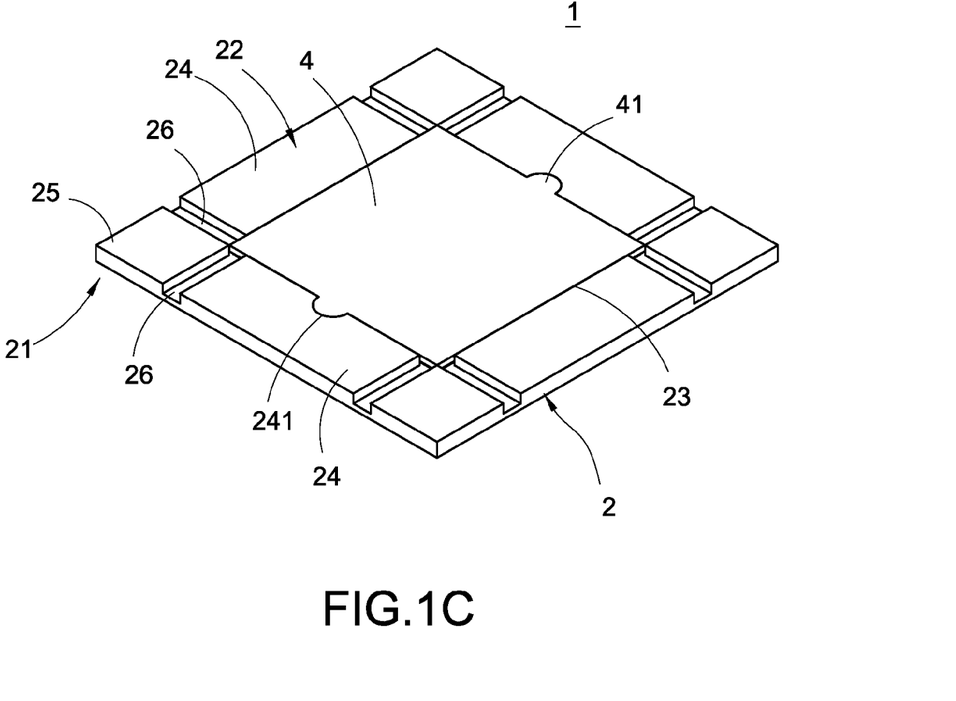
FIG. 1C is a second assembled perspective view of the first embodiment according to the present invention.

FIG. 1A is an exploded perspective view of a first embodiment according to the present invention. FIG. 1B is a first assembled perspective view of the first embodiment according to the present invention. FIG. 1C is a second assembled perspective view of the first embodiment according to the present invention. The present invention discloses a battery-embedded board 1 (referred to as the board 1 thereinafter), the board 1 mainly comprises a base 2, a battery 3, and a bottom cover 4.

As shown in FIG. 1A, the base 2 includes a top face 21 and a bottom face 22, and an accommodation space 23 is defined upon the bottom face 22. The base 2 in this embodiment is a square base. Four edge-locating elements 24 are set respectively at four edges of the bottom face 22 of the base 2, and four corner-locating elements 25 are set respectively at four corners of the bottom face 22 of the base 2. In this embodiment, the accommodation space 23 of the bottom face 22 is defined by the four edge-locating elements 24 and the four corner-locating elements 25. The base 2, however, can be a square base, a rectangular base, or a fan-shaped base which includes only one corner (the fan-shaped base only comprises one corner-locating element 25 and two edge-locating elements 24), but not intended to limit the scope of the present invention.

As described above, the base 2 is a square base and comprises four edge-locating elements 24 and four corner-locating elements 25 on the bottom face 22. Each of the four edge-locating elements 24 adjoins two of the four corner-locating elements 25 by two sides, and two through slots 26 are defined between each of the four edge-locating elements 24 and the adjacent two corner-locating elements 25, and the plurality of through slots 26 are communicated with the accommodation space 23. In other words, each of the four corner-locating elements 25 adjoins two of the four edge-locating elements 24 by two sides, as a result, each of the four corner-locating elements 25 adjoins two of the plurality of through slots 26 by a left side and a right side.

In the present embodiment, the battery 3 is a thin battery, and in particularly, is a lithium polymer battery, which is thin and has low risk of explosion, but not limit thereto. A shape of the battery 3 is corresponding to a shape of the accommodation space 23 of the base 2. The battery 3 has at least one set of conductive contacts including a positive electrode 31 and a negative electrode 32. As shown in FIG. 1A, the shape of the battery 3 is square and the battery 3 has four corners, the set of the conductive contacts is near one of the four corners. In particularly, the battery 3 can have four sets of the conductive contacts near each of the four corners respectively, or only have one set of the conductive contacts near one of the four corners, but not limited thereto.

As shown in FIG. 1B, the battery 3 is set in the accommodation space 23 of the bottom face 22 of the base 2. In this embodiment, the board 1 further comprises at least one positive cable 51 and at least one negative cable 52. One end of the positive cable 51 is electrically connected to the positive electrode 31 of the battery 3, and one end of the negative cable 52 is electrically connected to the negative electrode 32 of the battery 3. Other end of the positive cable 51 is extended out of the accommodation space 23 through one of the plurality of through slots 26, and other end of the negative cable 52 is extended out of the accommodation space 23 through another one of the plurality of through slots 26.

By way of the positive cable 51 and the negative cable 52, the battery 3 can connect with other batteries in other boards 1 to have series connections or parallel connections therewith. Also, the battery 3 can be connected with a power source (not shown in the figures) through the positive cable 51 and the negative cable 52, so as to receive power from the power source for further storage. Moreover, the battery 3 can also be connected with a load (not shown in the figures) through the positive cable 51 and the negative cable 52, so as to provide stored power to the load.

As shown in FIG. 1C, a shape of the bottom cover 4 is corresponding to the shape of the accommodation space 23, and the bottom cover 4 can exactly cover the accommodation space 23 for encapsulating the battery 3 between the base 2 and the bottom cover 4. The bottom cover 4 in this embodiment includes at leapt one protruding part 41 extended from one edge, the base 2 in this embodiment includes at least one corresponding concave hole 241 on one of the plurality of edge-locating elements 24, and the protruding part 41 exactly fix in the concave hole 241 when the bottom cover 4 is covered with the bottom face 22 of the base 2. The protruding part 41 and the concave hole 241 enhance the fixed effect of the bottom cover 4, and provide an easier way for user to take the bottom cover 4 off from the bottom face 22 of the base 2.

In this embodiment, a material of the base 2 is depending on user demand, for example, it can be woods, bricks, plastics, etc. The battery 3 is embedded and hid inside the base 2, and have series connections or parallel connections with other batteries through the positive cable 51 and the negative cable 52, or connects with the power source or the load. In other words, if floors, walls or ceilings of a building is constructed by the board 1 in the present invention, user will not see and not notice the existence of the batteries 3, and the batteries 3 will not occupy indoor spaces of the building. As a result, the present invention can stimulate user desire to build an electricity storing system in their house.

However, the board 1 in the present invention is used to construct the floors, the walls or the ceilings of the building, so waterproof effect of the board 1 should be considered for preventing damage of the battery 3.

Figure 2:
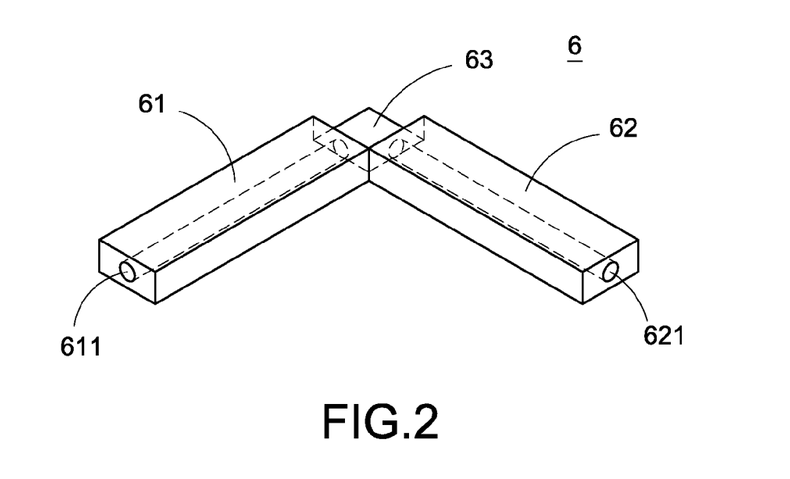
FIG. 2 is a perspective view of a waterproof element of a first embodiment according to the present invention.

FIG. 2 is a perspective view of a waterproof element of a first embodiment according to the present invention. As shown in FIG. 2, the board 1 further comprises a waterproof element 6. As shown in FIG. 1A above, each of the plurality of the corner-locating elements 25 adjoins two through slots 26 by two sides, and in this embodiment, one of the waterproof element 6 is according to one of the plurality of corner-locating elements 25, and is set in the two through slots 26 adjoined the two sides of the corner-locating element 25 for providing waterproof ability. For achieving perfect waterproof effect, the amount of the waterproof element 6 set in the board 1 should be the same as the amount of the plurality of corner-locating elements 25.

As shown in FIG. 2, the waterproof element 6 comprises a first waterproof strip 61, a second waterproof strip 62, and a connection element 63 connects the first waterproof strip 61 and the second waterproof strip 62 together. Positions and shapes of the two waterproof strips 61 and 62 are corresponding to that of the two through slots 26 beside the left side and the right side of the corner-locating element 25. In this embodiment, a shape of the waterproof element 6 is "L" shape, and an angle between the first waterproof strip 61 and the second waterproof strip 62 is 90 degree, but not limited thereto.

The first waterproof strip 61 has a first through hole 611 passed through a front end and a rear end of the first waterproof strip 61, and the second waterproof strip 62 has a second through hole 621 passed through a front end and a rear end of the second waterproof strip 62. The first through hole 611 and the second through hole 621 are used to contain the above mentioned positive cable 51 and negative cable 52.

Figure 3A:
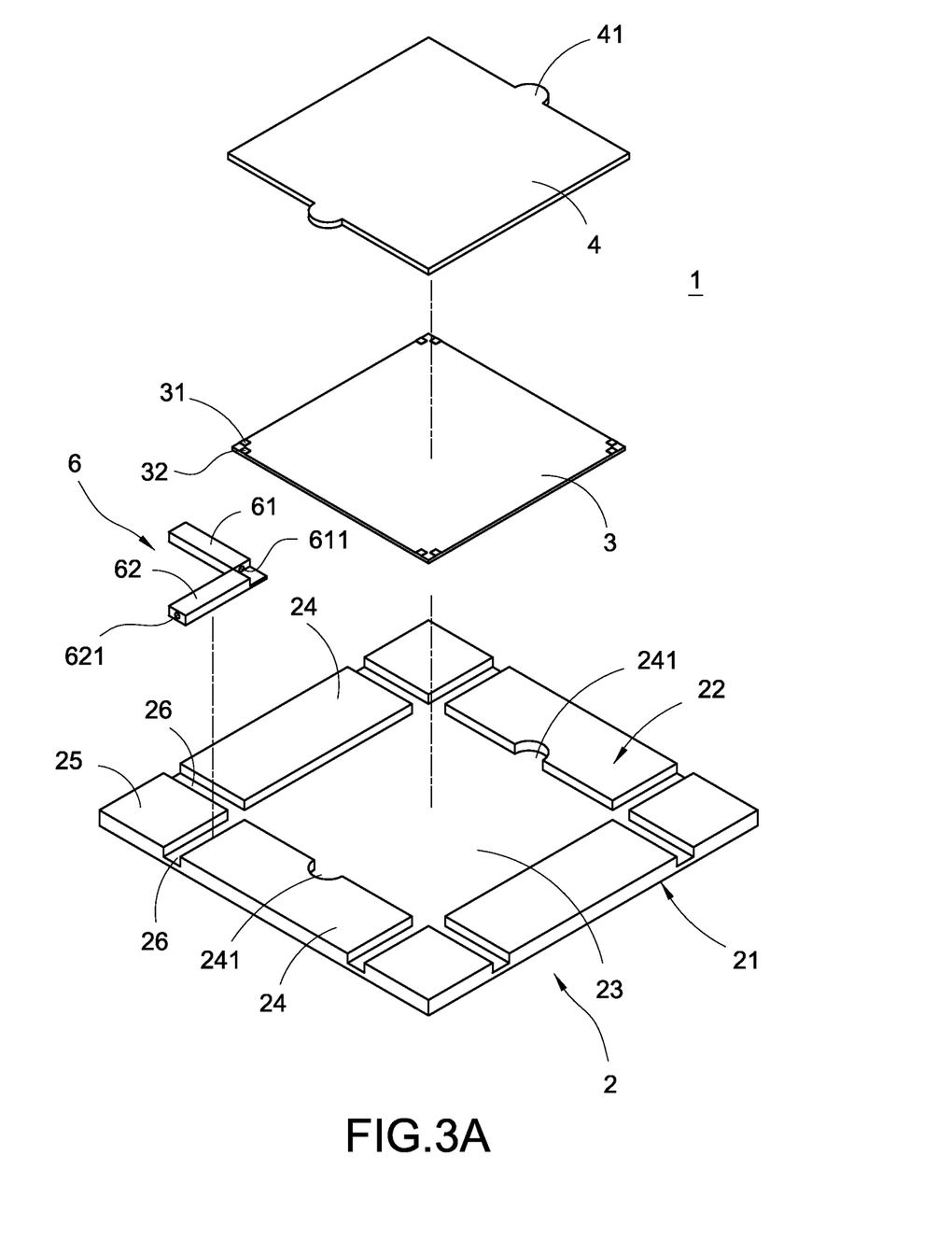
FIG. 3A is an exploded perspective view of a second embodiment according to the present invention.
Figure 3B:
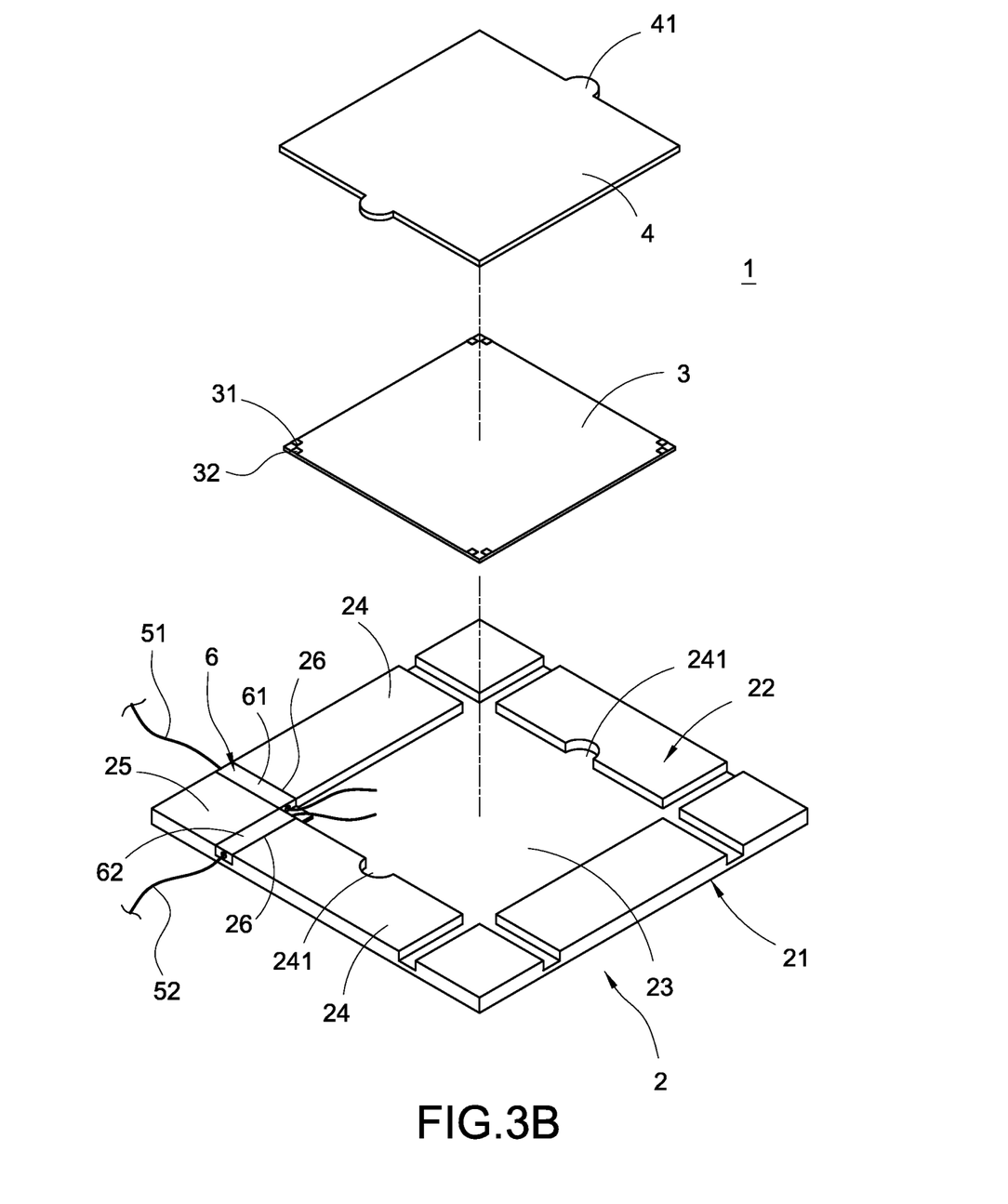
FIG. 3B is a first combination perspective view of the second embodiment according to the present invention.
Figure 3C:
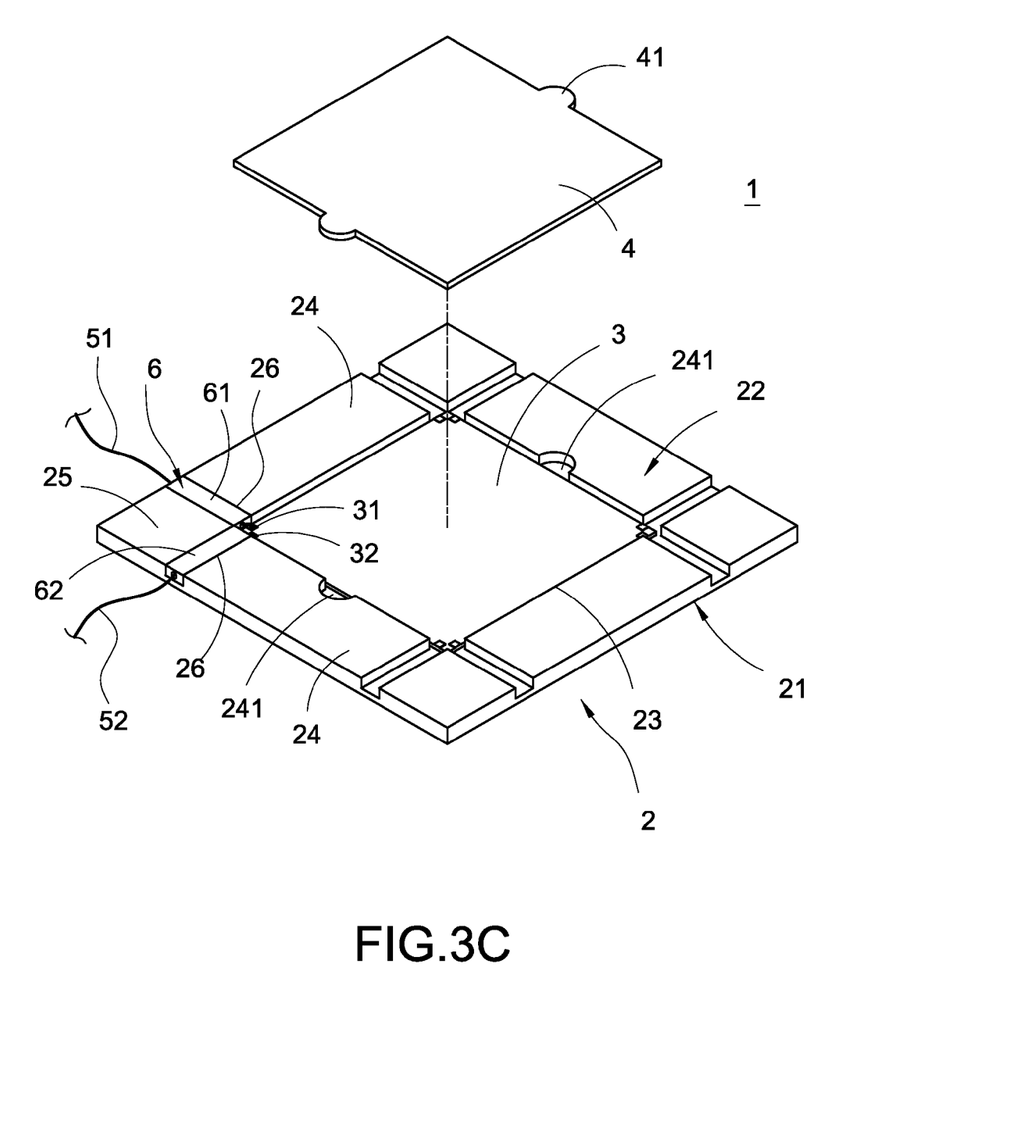
FIG. 3C is a second combination perspective view of the second embodiment according to the present invention.
Figure 3D:
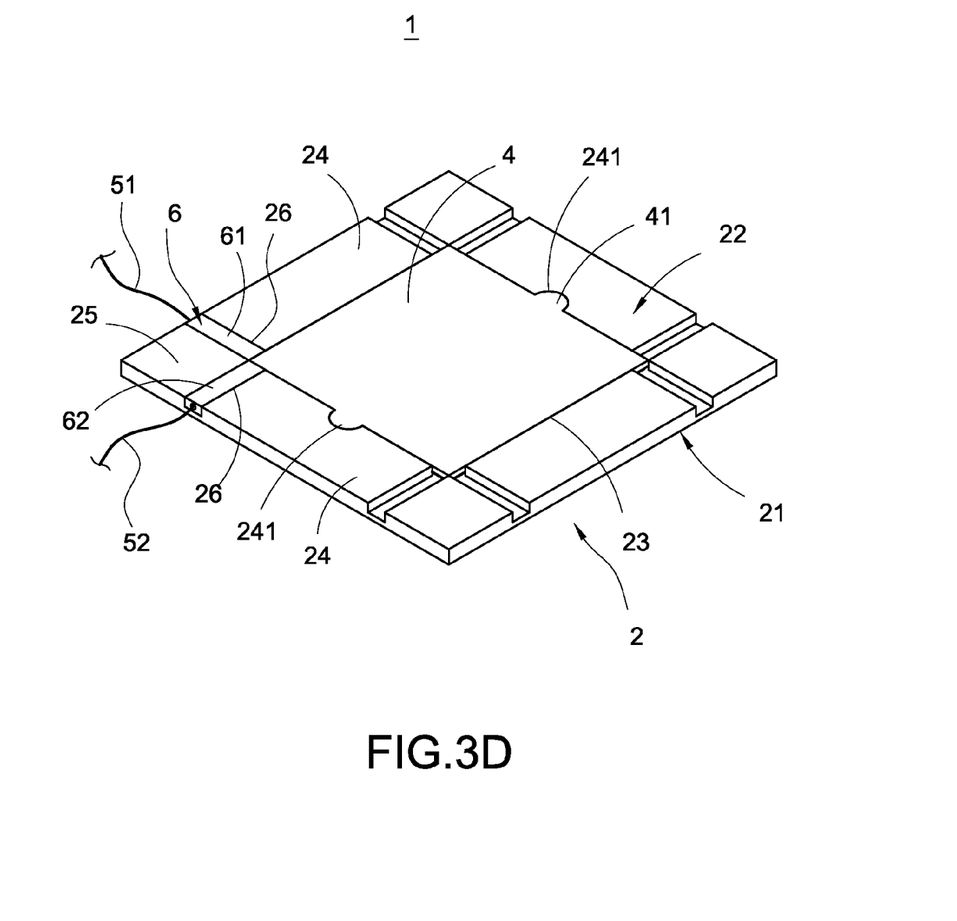
FIG. 3D is a third combination perspective view of the second embodiment according to the present invention.

FIG. 3A is an exploded perspective view of a second embodiment according to the present invention. FIG. 3B is a first combination perspective view of the second embodiment according to the present invention. FIG. 3C is a second combination perspective view of the second embodiment according to the present invention. FIG. 3D is a third combination perspective view of the second embodiment according to the present invention.

As shown in FIG. 3A, the first waterproof strip 61 of the waterproof element 6 is set in the through slot 26 adjoined one side (such as the left side) of the corner-locating element 25, and the second waterproof strip 62 of the waterproof element 6 is set in other through slot 26 adjoined other side (such as the right side) of the same corner-locating element 25.

As shown in FIG. 3B, if the two waterproof strips 61 and 62 are set in the two through slots 26 beside the two sides of the corner-locating element 25, the connection element 63 of the waterproof element 6 is just located in the accommodation space 23. As shown in FIG. 3C, the connection element 63 in the accommodation space 23 is pressed by the battery 3 after the battery 3 is set into the accommodation space 23. In other words, the waterproof element 6 in the board 1 is fixed by one corner-locating element 25 and two edge-locating elements 24 beside the two through slots 26, and also fixed by the battery 3.

In this embodiment, one end of the positive cable 51 is electrically connected to the positive electrode 31 of the battery 3, one end of the negative cable 52 is electrically connected to the negative electrode 32 of the battery 3, and other end of the positive cable 51 and the negative cable 52 are extended out of the accommodation space 23 through the first through hole 611 and the second through hole 621 respectively. Therefore, the board 1 has complete waterproof ability after waterproof stoppers (not shown in Figures) are set at exit of the first through hole 611 and the second through hole 621.

As shown in FIG. 3D, the bottom cover 4 covers the accommodation space 23. As a result, the battery 3 is encapsulated between the base 2 and the bottom cover 4, and the bottom cover 4 also fixes the battery 3 and the waterproof element 6.

Figure 4:
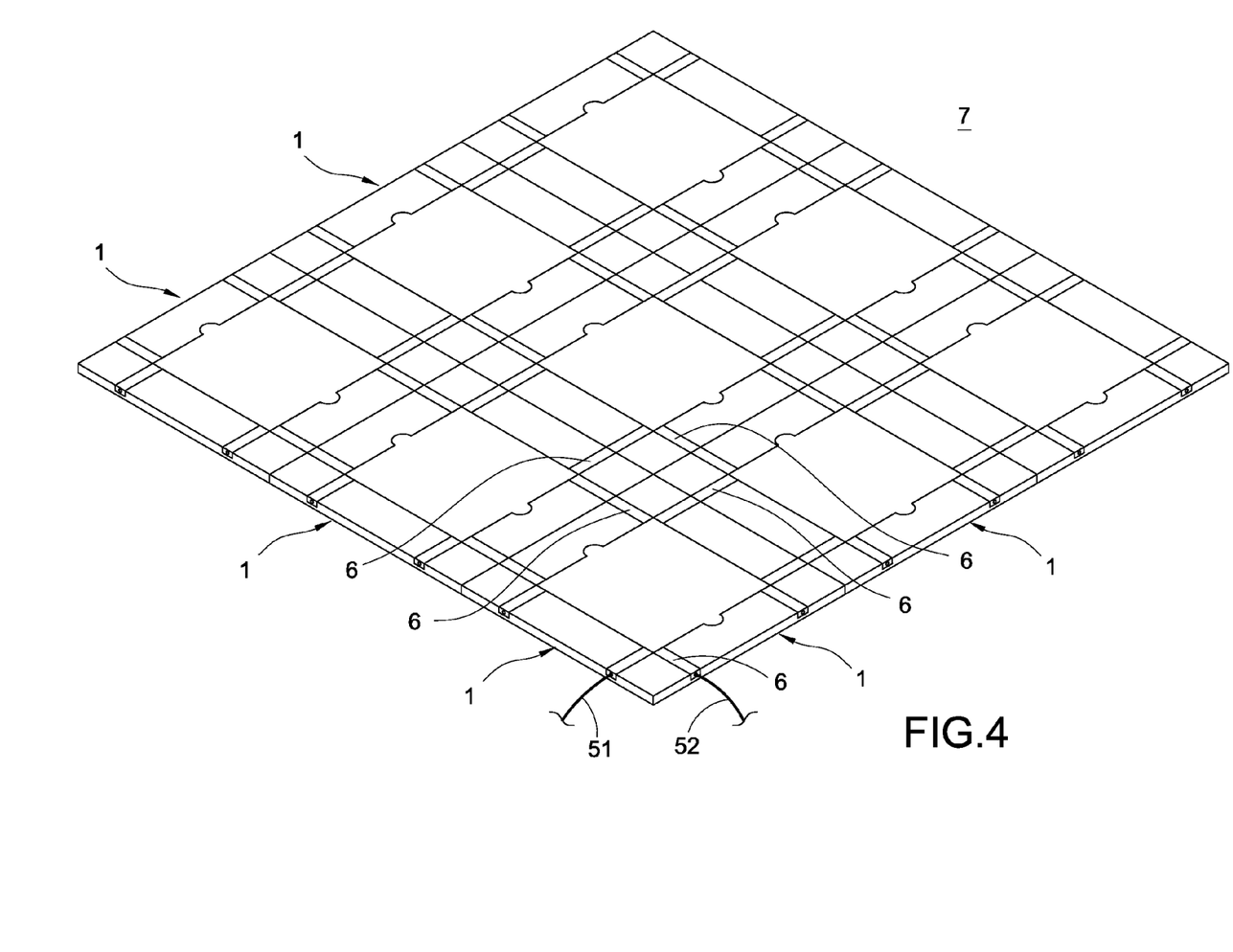
FIG. 4 is a perspective view of a board assembly of a first embodiment according to the present invention.

FIG. 4 is a perspective view of a combination board of a first embodiment according to the present invention. In this embodiment, the battery 3 of the board 1 has four sets of the conductive contacts near four corners, therefore, a plurality of batteries 3 can have series connections or parallel connections with each other through a plurality of positive cables 51 and negative cables 52 when a plurality of boards 1 are combined into a board assembly. The present invention not only combines a plurality of base 2 into a large board, but also connects the plurality of batteries 3 of the plurality of bases 2 into a large battery capable of a big capacity electricity storage space.

It should be mentioned is that the shape of the waterproof element 6 mentioned above is "L" shape. In this embodiment, however, four boards 1 can be combined together, and four waterproof elements 6 can be constructed into a square shape waterproof element, which can help the four batteries 23 of the four boards 1 to have series connection/parallel connection with each other.

The board 1 in the present invention is used in a building, and in particularly, the board 1 is combined into the board assembly 7 shown in FIG. 4, and the board assembly 7 is used to construct the floors of the building. It is to say, the capacity of the electricity storage space built by the plurality of batteries 3, is according to size of area of the floors constructed by a plurality of board assembly 7 in the building. Also, the batteries 23 are embedded in the boards 1 respectively, even the amount of the batteries 23 is excessively large, the batteries 23 do not occupy indoor spaces of the building.

In other embodiment, the material of the base 2 can be materials suitable for building walls, such as bricks or partitions, therefore, the board assembly 7 mentioned above can be used to construct the walls of the building. In this embodiment, the capacity of the electricity storage space built by the plurality of batteries 3, is according to size of area of the walls constructed by the plurality of board assembly 7 in the building.

In another embodiment, the material of the base 2 can be materials suitable for building ceilings, such as woods or light-gauge steels, therefore, the board assembly 7 mentioned above can be used to construct the ceilings of the building. In this embodiment, the capacity of the electricity storage space built by the plurality of batteries 3, is according to size of area of the ceilings constructed by the plurality of board assembly 7 in the building.

The board 1 and the board assembly 7 in the present invention helps user to build the big capacity electricity storage space without occupying indoor spaces and with ease, and the power generated by natural power generating apparatuses can be easily stored for reducing electricity fee.

As the skilled person will appreciate, various changes and modifications can be made to the described embodiment. It is intended to include all such variations, modifications and equivalents which fall within the scope of the present invention, as defined in the accompanying claims.

What is claimed is:

1. A battery-embedded board, comprising:
   a base having an accommodation space, and comprising a corner-locating element and two edge-locating elements adjoining two connecting sides of the corner-locating element respectively, the base having two through slots, the two through slots being between each of the connecting sides of the corner-locating element and each of the two edge-locating elements respectively, and the two through slots communicating with the accommodation space;
   an L-shaped waterproof element, the waterproof element being fitted into the two through slots, the waterproof element having a first waterproof strip and a second waterproof strip being perpendicular to each other, the first waterproof strip being fitted into one of the two through slots adjoining one of the two connecting sides of the corner-locating element, and the second waterproof strip being fitted into the other one of the two through slots adjoining the other one of the two connecting sides of the corner-locating element; and
   a battery having a shape corresponding to that of the accommodation space, the battery being set in the accommodation space and fixed by the corner-locating element and the two edge-locating elements, and the battery having at least one set of conductive contacts composed of a positive electrode and a negative electrode.

2. The battery-embedded board according to claim 1, further comprising a bottom cover having a shape corresponding to that of the accommodation space, and the bottom cover covers the accommodation space for encapsulating the battery between the base and the bottom cover.

3. The battery-embedded board according to claim 2, wherein one side of the bottom cover has a protruding part, and one of the two edge-locating elements has a corresponding concave hole, and the protruding part is fixed in the concave hole when the bottom cover covers the accommodation space.

4. The battery-embedded board according to claim 1, wherein the base has a top face and a bottom face, and the accommodation space is defined on the bottom face of the base, and the corner-locating element and the two edge-locating elements are set on the bottom face of the base.

5. The battery-embedded board according to claim 1, wherein the base is square and has four edge-locating elements and four corner-locating elements, wherein the four edge-locating elements are set respectively at four edges of the base, and the four corner-locating elements are set respectively at four corners of the base.

6. The battery-embedded board according to claim 5, wherein the battery is square and has four sets of the conductive contacts, and the four sets of the conductive contacts are set respectively near four corners of the battery.

7. The battery-embedded board according to claim 1, further comprising a positive cable and a negative cable, one end of the positive cable is electrically connected to the positive electrode, and one end of the negative cable is electrically connected to the negative electrode, and other end of the positive cable and the negative cable are extended out of the accommodation space through the two through slots respectively.

8. The battery-embedded board according to claim 1, wherein the waterproof element has a connection element connecting the first waterproof strip and the second waterproof strip, and the connection element is located in the accommodation space when the waterproof element is set in the two through slots.

9. The battery-embedded board according to claim 8, wherein the first waterproof strip has a first through hole passed through a front end and a rear end of the first waterproof strip, the second waterproof strip has a second through hole passed through a front end and a rear end of the second waterproof strip, and the first through hole and the second through hole contain a positive cable and a negative cable respectively, wherein one end of the positive cable is electrically connected to the positive electrode, one end of the negative cable is electrically connected to the negative electrode, and other end of the positive cable and the negative cable are extended out of the accommodation space through the first through hole and the second through hole respectively.

10. An interconnectable battery-embedded board assembly, comprising:
   a plurality of interconnectable battery-embedded boards, each of the interconnectable battery-embedded boards including:
      a base having an accommodation space, and comprising at least one corner-locating element and at least two edge-locating elements adjoining two connecting sides of the at least one corner-locating element respectively, the base having at least two through slots, the at least two through slots being between each of the connecting sides of the corner-locating element and each of the at least two edge-locating elements respectively, and the at least two through slots communicating with the accommodation space; and
   a battery having a shape corresponding to that of the accommodation space, the battery being set in the accommodation space and fixed by the at least one corner-locating element and the at least two edge-locating elements, and the battery having at least one set of conductive contacts composed of a positive electrode and a negative electrode,
   wherein the plurality of interconnectable battery-embedded boards are connected to each other, and
   wherein the at least two edge-locating elements, the at least one corner-locating element, and the at least two through slots of any one of the interconnectable battery-embedded boards are corresponding to those of adjacent interconnectable battery-embedded board.

* * * * *